United States Patent
Kumayasu et al.

(10) Patent No.: US 6,792,192 B1
(45) Date of Patent: Sep. 14, 2004

(54) OPTICAL VARIABLE ATTENUATOR

(75) Inventors: Satoshi Kumayasu, Tokyo (JP); Eiichi Nakagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 128 days.

(21) Appl. No.: 10/129,960

(22) PCT Filed: Oct. 4, 2000

(86) PCT No.: PCT/JP00/06921
§ 371 (c)(1),
(2), (4) Date: May 20, 2002

(87) PCT Pub. No.: WO02/29477
PCT Pub. Date: Apr. 11, 2002

(51) Int. Cl.[7] .......................... G02F 1/09; G02F 1/095; G02B 6/27
(52) U.S. Cl. .............................. 385/140; 385/6; 385/11; 359/281; 359/282; 359/497
(58) Field of Search .......................... 385/4, 6, 27, 39, 385/49, 140; 359/280–284, 497, 499

(56) References Cited

U.S. PATENT DOCUMENTS

| | | | |
|---|---|---|---|
| 5,657,151 A | 8/1997 | Swan et al. | |
| 5,978,135 A | 11/1999 | Abbott et al. | |
| 6,018,412 A | 1/2000 | Fukushima | |
| 6,407,836 B1 * | 6/2002 | Fukushima | 359/337 |

FOREIGN PATENT DOCUMENTS

| | | | |
|---|---|---|---|
| EP | 932067 | 7/1999 | |
| EP | 932068 | 7/1999 | |
| JP | 60130934 | 7/1985 | |
| JP | 3-214374 | 9/1991 | |
| JP | 03214374 A * | 9/1991 | G06G/7/60 |
| JP | 06-051255 | 2/1994 | |
| JP | 07212315 | 8/1995 | |
| WO | 98/56186 | 12/1998 | |

* cited by examiner

Primary Examiner—Hemang Sanghavi
Assistant Examiner—Omar Rojas
(74) Attorney, Agent, or Firm—Oblon, Spivak, McClelland, Maier & Neustadt, P.C.

(57) ABSTRACT

An optical variable attenuator is provided including polarizers for extracting a predetermined polarized wave component from an input optical signal, an array of Faraday rotators formed of a ferromagnetic material and arranged in series for rotating the plane of polarization of the input signal, electromagnetic coils for supplying magnetic fields to the Faraday rotators, and current supply control circuits for setting the polarization-rotating angle of the array by controlling the intensity of the magnetic fields supplied to the Faraday rotators. The polarization-rotation angle of the array can be finely adjusted and maintained, even when the magnetic fields are not continuously supplied to the Faraday rotators.

3 Claims, 3 Drawing Sheets

# OPTICAL VARIABLE ATTENUATOR

BACKGROUND OF THE INVENTION

1. Field of the Invention

The present invention relates to an optical variable attenuator suitable for use as an equalizer that compensates for the wavelength dependence of the gain of a repeater constituting an optical communication system such as an optical submarine cable or of the loss of an optical signal in the optical cable.

2. Description of the Background Art

With the view to increasing its transmission capacity, an optical submarine cable system or similar optical communication system usually employs a WDM (Wavelength Division Multiplexing) transmission scheme that multiplexes optical signals of plural wavelengths. To enhance the characteristic of such WDM transmission, it is necessary that the optical signal level of each wavelength of the wavelength-multiplexed signal be held as constant, as possible. To meet this requirement, an equalizer is inserted in the transmission line that compensates for the gain-wavelength characteristic of a repeater or the wavelength loss characteristic of the optical signal by the transmission line. More specifically, the optical signal level of each wavelength of the wavelength-multiplexed signal is held constant by using an equalizer that has a transmission loss characteristic opposite to the sum of wavelength characteristics of the repeater and the transmission line.

However, when the gain-loss wavelength characteristic of the repeater or optical cable changes due to its deterioration during operation of the optical submarine cable system, the transmission loss characteristic of the equalizer does not correspond with the sum of wavelength characteristics of the repeater and the transmission line, resulting in a failure to hold the optical signal of each wavelength of the wavelength-multiplexed signal at a constant level. This incurs the possibility of decreasing the total amount of transmission of the optical submarine cable system.

Such a problem could be solved by using an equalizer whose transmission-loss characteristic is variable even during operation of the optical submarine cable system. That is, when the repeater or optical cable deteriorates, the optical signal of each wavelength of the wavelength-multiplexed signal can be held at a constant level by suitably adjusting the transmission loss characteristic of the equalizer to correspond with an inverse characteristic of the sum of the wavelength characteristics that the repeater and the transmission line have after its deterioration.

FIG. 1 is a diagram depicting the construction of a conventional optical variable attenuator that is used as an equalizer whose transmission loss characteristic is variable as described above. In FIG. 1, reference numeral 1 denotes generally a prior-art optical variable attenuator, which controls the intensity of the optical signal input thereto and outputs an optical signal of a desired intensity. Reference numeral 2 denotes a polarizer placed at the input side of a Faraday rotator 4, which extracts a predetermined polarized wave from the input optical signal and outputs the extracted wave. Reference numeral 3 denotes a polarizer placed at the output side of the Faraday rotator 4, which outputs only a predetermined polarized wave component of the optical signal having its plane of polarization rotated by the Faraday rotator 4. Reference numeral 4 denotes a Faraday rotator formed of a paramagnetic material, which rotates the plane of polarization of the optical signal from the polarizer 2 in accordance with the intensity of the magnetic field produced by an electromagnetic coil 5. Reference numeral 5 denotes an electromagnetic coil that provides a magnetic field to the Faraday rotator 4. Reference numeral 6 denotes a feeding terminal of the electromagnetic coil 5, through which a control current from a control current supply circuit 7 is supplied to the electromagnetic coil 5. Reference numeral 7 denotes a control current supply circuit, which is capable of suitably changing the current value of the control current supply to the electromagnetic coil 5 in accordance with a change in the gain-wavelength characteristic of the repeater or in the loss-wavelength characteristic of the transmission line in the optical communication system.

Next, the operation of the prior art example will be described below.

In the first place, an optical signal sent in the direction of the arrow in FIG. 1 is rendered into parallel rays by a lens (not shown) placed at the input side of the optical variable attenuator 1, thereafter being input to the polarizer 2. The polarizer 2 extracts a predetermined polarized wave from the above-mentioned optical signal, and inputs it to the Faraday rotator 4. To the Faraday rotator 4 is being applied from the electromagnetic coil 5 a magnetic field of an intensity corresponding to the value of the control current fed thereto. The Faraday rotator 4 rotates the polarized wave of the optical signal through an angle corresponding to the intensity of the above-mentioned magnetic field. Following this, only a predetermined polarized wave component is extracted by the polarizer 3 from the optical signal fed thereto from the Faraday rotator 4 and is output from the optical variable attenuator 1.

With the control current to the electromagnetic coil 5 set at a suitable value by the control current supply circuit 7, it is possible to control the intensity of the magnetic field to be applied to the Faraday rotator 4. This permits selective setting of a desired polarization-rotating angle for the Faraday rotator 4. Accordingly, the optical signal to be emitted from the optical variable attenuator 1 is set at a desired intensity by selecting the polarized wave component of the optical signal that is extracted by the polarizer 3.

Thus, even if the gain-wavelength characteristic and loss-wavelength characteristic of the repeater and the optical cable vary due to their degradation, the variations can be compensated for during operation of the optical submarine cable system.

The concept of the above-described optical variable attenuator 1 is disclosed in such prior art literature as Japanese Patent Application Laid-Open Gazette No. 212315/95. The prior art literature concerns an optical isolator, not the optical variable attenuator, but it discloses a concept common to the optical variable attenuator 1 in the usage of an electromagnetic coil to make variable the intensity of the magnetic field to be applied to the Faraday rotator.

With the conventional optical variable attenuator of the above construction, since the Faraday rotator 4 is formed of a paramagnetic material, a continuous supply of a fixed-value current to the electromagnetic coil 5 is needed to maintain the polarization-rotating angle constant—this gives rise to a problem that the supply of the above-mentioned fixed-value current may sometimes become impossible due to secular changes of such a current path as the electromagnetic coil 5 or feeding terminal 6 and such a current supply source as the control current supply circuit 7.

That is, the conventional optical variable attenuator is not suitable for use in an optical communication system such as an optical submarine cable system that is difficult of frequent maintenance of parts used therein but requires long-term reliability.

A possible solution to the above-mentioned problem is to form the Faraday rotator by a ferromagnetic substance. The reason for this is that the Faraday rotator formed of the ferromagnetic substance maintains the polarization-rotating angle by its spontaneous magnetization even if the power feed to the electromagnetic coil is stopped.

Since the spontaneous magnetization develops stably in only two opposite directions, however, the polarization-rotating angle of the Faraday rotator can be set at only two values. Accordingly, the transmission loss characteristic of the optical variable attenuator can also be set at only two values—this makes it impossible to flexibly deal with variations in the gain-loss wavelength characteristic by the deterioration of the repeater or optical cable.

The present invention is intended to solve the above-mentioned problems, and has for its object to provide an optical variable attenuator that keep the transmission loss characteristic unchanged even if the power feed to the electromagnetic coil is stopped and permits fine setting of the transmission loss characteristic.

SUMMARY OF THE INVENTION

An optical variable attenuator according to an aspect of the present invention comprises: a plurality of polarizer means for extracting a predetermined polarized wave component from an input optical signal; polarized-wave rotating means composed of an array of Faraday rotators formed of a ferromagnetic material and arranged in series between the plurality of polarizer means, and magnetic field supply means provided for each Faraday rotator, for supplying thereto a magnetic field for rotating the polarized wave component of the optical signal; and polarization-rotating angle control means for setting polarization-rotating angles of the Faraday rotator array based on a combination of polarization-rotating angles each set for one of the Faraday rotators by controlling the intensity of the magnetic field supplied to each Faraday rotator from the magnetic field supply means.

With the above construction, since the Faraday rotators are each formed of the ferromagnetic material, it is possible to maintain the transmission loss characteristic of the optical variable attenuator by the spontaneous magnetization of the Faraday rotators without the need for continuously applying thereto magnetic fields from the outside and to finely set the transmission loss characteristic; hence, the optical variable attenuator of the present invention is suitable for use in an optical submarine cable system or similar optical communication system that is difficult of frequent maintenance of the parts used therein and requires long-term reliability.

In an optical variable attenuator according to another aspect of the present invention, the Faraday rotator array comprises at least two or more Faraday rotators of different polarization-rotating angles, and the polarization-rotating angle control means sets the polarization-rotating angles of the Faraday rotator array based on a combination of the different polarization-rotating angles each set for one of the Faraday rotators.

The above construction permits fine setting of the transmission loss characteristic of the optical variable attenuator.

DETAILED DESCRIPTION OF THE DRAWINGS

To facilitate a better understanding of the present invention, a description will be given, with reference to the drawings, of an operation of the present invention.

Embodiment 1

Figure 1:
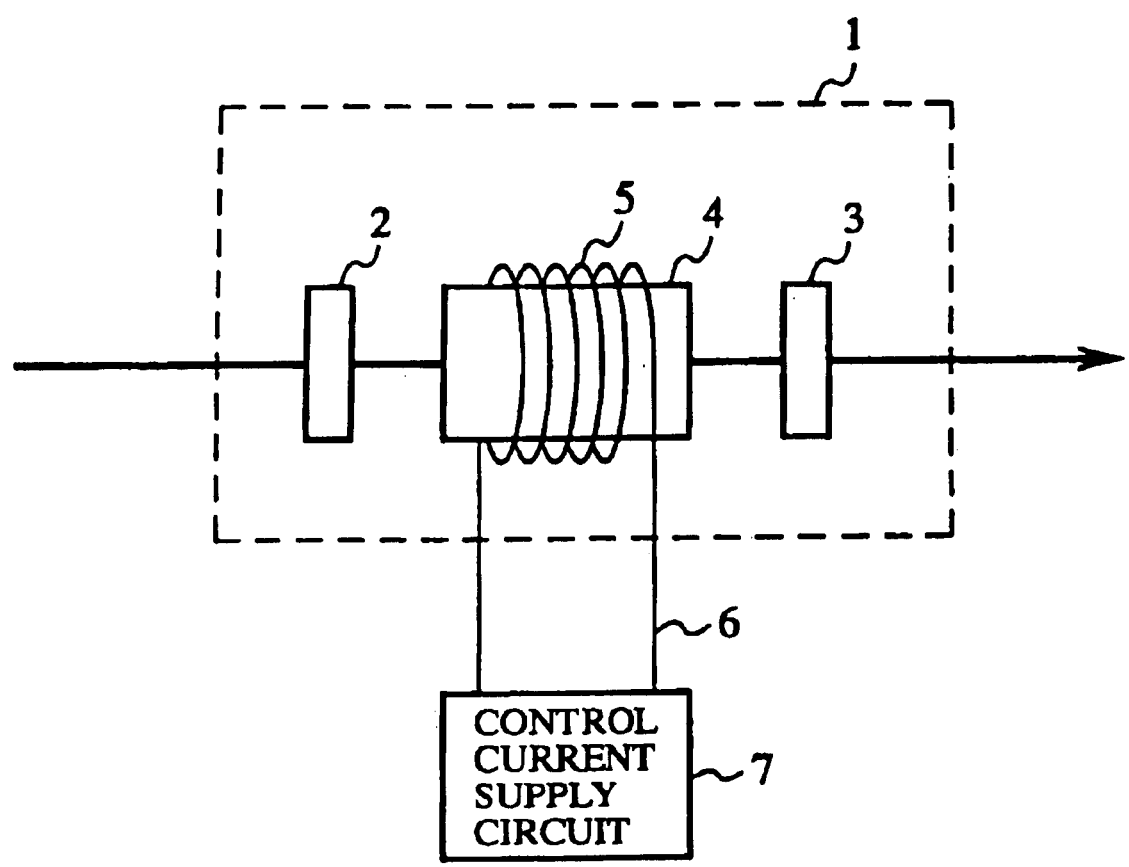
FIG. 1 is a diagram showing the construction of a conventional optical variable attenuator.
Figure 2:
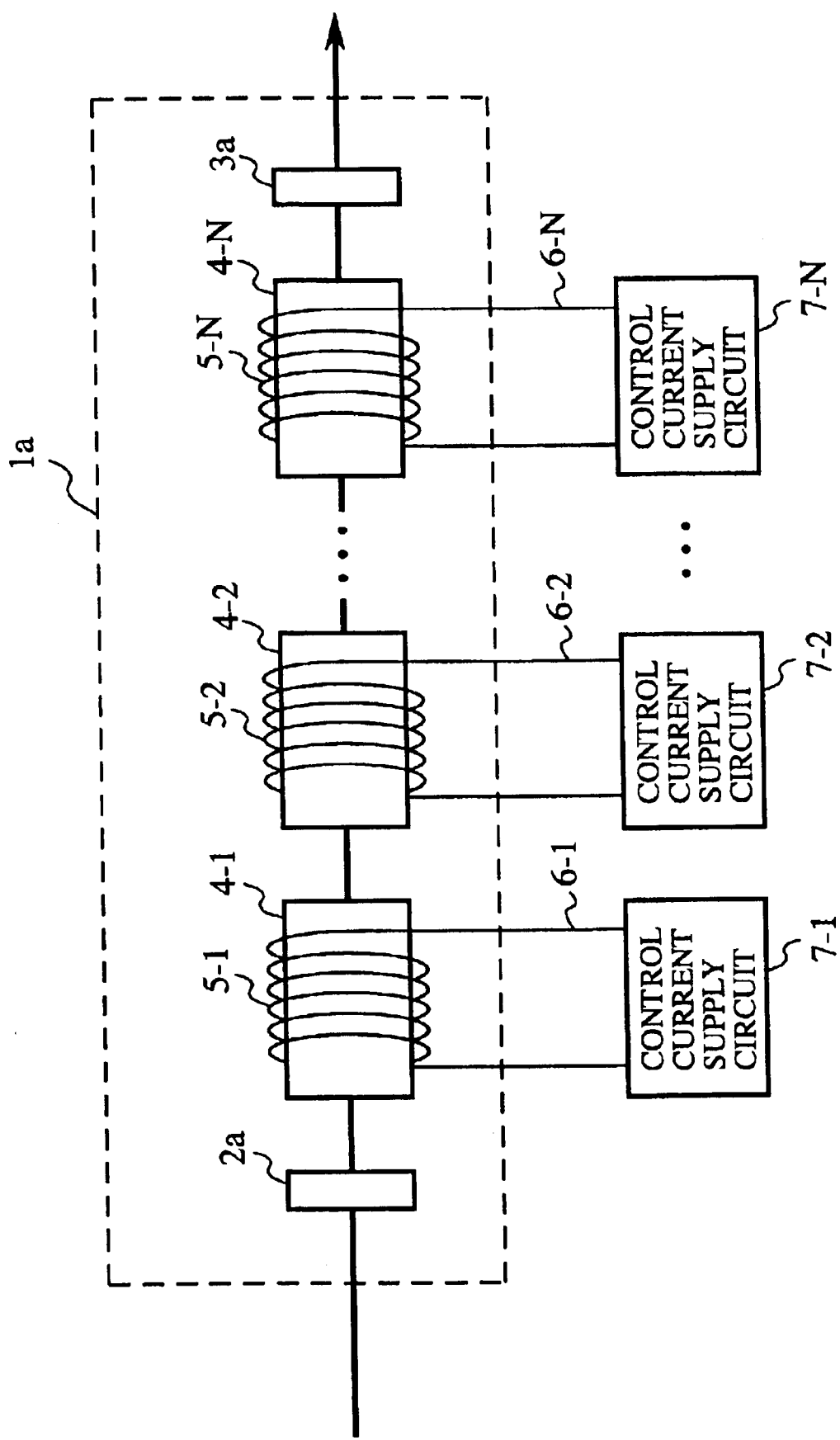
FIG. 2 is a diagram illustrating a basic construction of an optical variable attenuator according to Embodiment 1 of the present invention.

FIG. 2 is a diagram illustrating a basic configuration of an optical variable attenuator according to Embodiment 1. In FIG. 2, reference numeral 1a denotes generally the optical variable attenuator; and 2a denotes a polarizer placed at the input side of a Faraday rotator 4-1, which extracts a predetermined polarized wave from the input optical signal and outputs the extracted polarized wave. Reference numeral 3a denotes a polarizer placed at the output side of a Faraday rotator 4-N, which outputs only a predetermined polarized wave component of a optical signal having its plane of polarization rotated by the Faraday rotators 4-1 to 4-N. Reference numerals 4-1 to 4-N denote Faraday rotators formed of a ferromagnetic material and arranged in series between the polarizers 2a and 3a, which rotate the plane of polarization of the optical signal from the polarizer 2a in accordance with the intensities of magnetic fields provided by electromagnetic coils. The ferromagnetic material for the Faraday rotators 4-1 to 4-N is, for example, YIG (yttrium iron garnet $Y_3Fe_5O_{12}$ or bismuth-substituted rare earth iron garnet $Gd_{1-x}Bi_xFe_5O_{12}$). Reference numerals 5-1 to 5-N denote electromagnetic coils for applying magnetic fields to the Faraday rotators 4-1 to 4-N. Reference numerals 6-1 to 6-N denote feeding terminals of the electromagnetic coils 5-1 to 5-N, through which control currents from control current supply circuits 7-1 to 7-N are supplied to the electromagnetic coils 5-1 to 5-N. Reference numerals 7-1 to 7-N denote control current supply circuits, which are capable of properly changing values of the control currents for the electromagnetic coils 5-1 to 5-N in response to changes in the gain-wavelength characteristic of the repeater and loss-wavelength characteristic of the transmission line in the optical communication system.

Next, the operation of this embodiment will be described below.

In the first place, an optical signal sent in the direction of the arrow in FIG. 2 is rendered into parallel rays by a lens (not shown) placed at the input side of the optical variable attenuator 1a, thereafter being input to the polarizer 2a. The polarizer 2a extracts a predetermined polarized wave from the above-mentioned optical signal, and inputs it to the Faraday rotator 4-1. To the Faraday rotator 4-1 is being applied from the electromagnetic coil 5-1 a magnetic field of an intensity corresponding to the value of the control current fed thereto. Hence, the Faraday rotator 4-1 rotates the polarized wave of the optical signal through a polarization-rotating angle corresponding to the intensity of the above-mentioned magnetic field. Following this, the optical signal output from the Faraday rotator 4-1 is launched into the Faraday rotators 4-2 to 4-N one after another to which are applied from the electromagnetic coils 5-2 to 5-N the magnetic fields corresponding to the values of the control currents fed thereto. The Faraday rotators 4-2 to 4-N each rotate the polarized wave of the optical signal through a polarization-rotating angle corresponding to the intensity of the magnetic field applied to each rotator. Then, only a predetermined polarized wave component is extracted by the polarizer 3a from the optical signal fed thereto from the Faraday rotator 4-N and is provided as an output optical signal from the optical variable attenuator 1a.

The magnetic fields applied by the electromagnetic coils 5-1 to 5-N to the Faraday rotators 4-1 to 4-N can be adjusted independently to proper intensities by properly controlling the control currents to the electromagnetic coils 5-1 to 5-N by the control current supply circuits 7-1 to 7-N, respectively. This permits independent setting of desired polarization-rotating angles for the Faraday rotators 4-1 to 4-N. Accordingly, in the case where the Faraday rotators 4-1 to 4-N are each formed of the ferromagnetic material, too, $2^N$ polarization-rotating angles, that is, $2^N$ loss characteristics are obtainable with the Faraday rotators 4-1 to 4-N based on a combination of their polarization-rotating angles set by the control current supply circuits 7-1 to 7-N.

Further, as referred to previously, the use of the ferromagnetic material for the Faraday rotators enables the polarization-rotating angles to be held by their spontaneous magnetization even if the control current supply to the electromagnetic coils 5-1 to 5-N is stopped.

Figure 3:
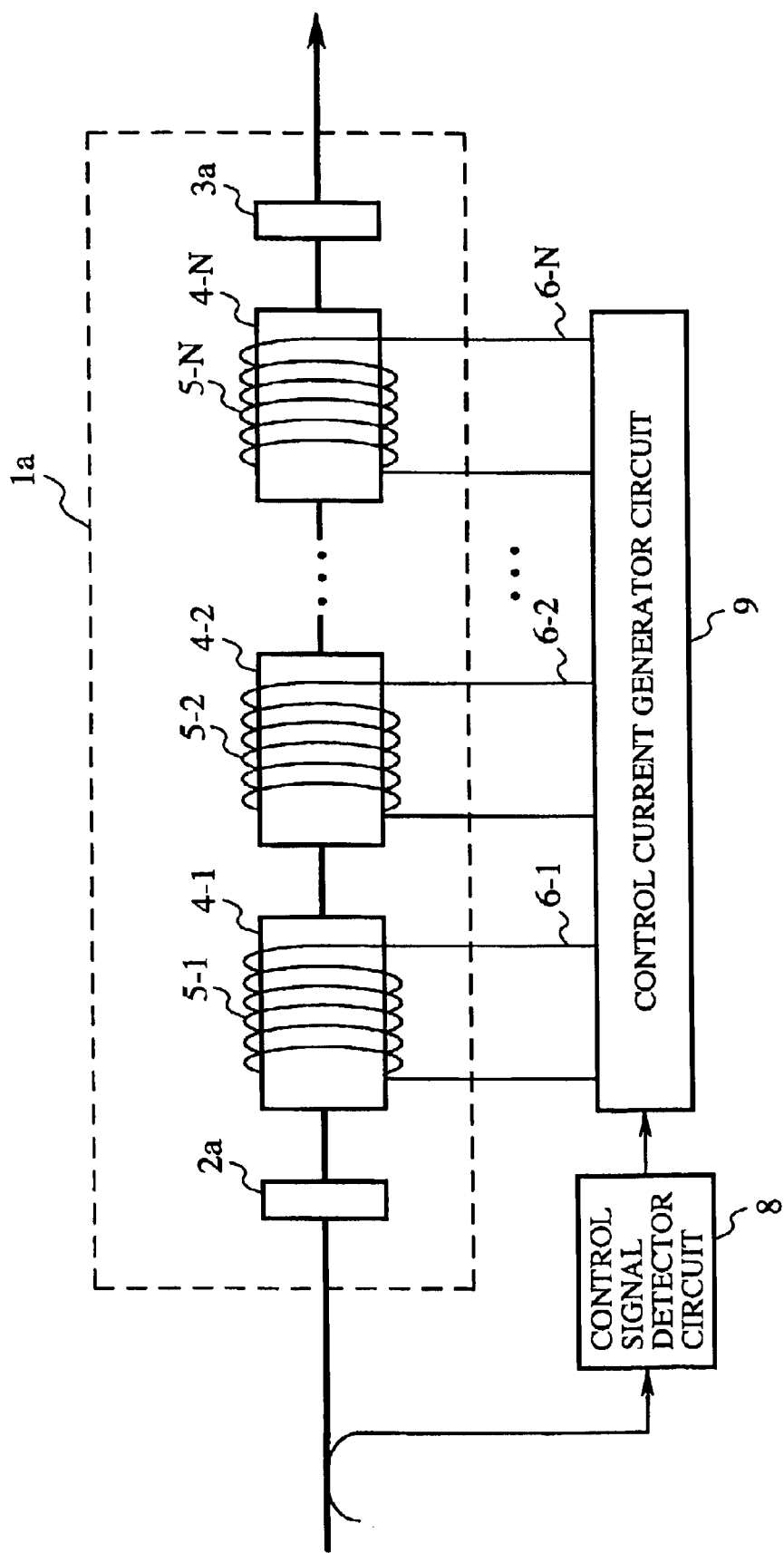
FIG. 3 is a diagram illustrating a concrete construction of the optical variable attenuator according to Embodiment 1 of the present invention.

FIG. 3 is a diagram illustrating a concrete configuration of the optical variable attenuator according to Embodiment 1 of the present invention. In FIG. 3, reference numeral 8 denotes a control signal detector circuit that detects from the optical signal a control signal for setting the value of the current to be supplied to each of the electromagnetic coils 5-1 to 5-N and sends the control signal to a control current generator circuit 9; and 9 denotes a control current generator circuit electrically connected to the feeding terminals 6-1 to 6-N of the electromagnetic coils 5-1 to 5-N, for supplying them with pulse currents of the values based on the control signals detected by the control signal detector circuit 8.

Incidentally, like parts are identified by the same reference numerals as in FIG. 2, and no description will be repeated.

Next, the operation of the illustrated example will be described below.

In the first place, an optical signal sent in the direction of the arrow in FIG. 3 is rendered into parallel rays by a lens (not shown) placed at the input side of the optical variable attenuator 1a, thereafter being input to the polarizer 2a. A predetermined polarized wave is extracted by the polarizer 2a from the above-mentioned optical signal, and it is launched into the Faraday rotators 4-1 to 4-N one after another to which are applied from the electromagnetic coils 5-2 to 5-N the magnetic fields corresponding to the values of the control currents fed thereto. The Faraday rotators 4-1 to 4-N each rotate the polarized wave of the optical signal through a polarization-rotating angle corresponding to the intensity of the magnetic field applied to each rotator. Then, only a predetermined polarized wave component is extracted by the polarizer 3a from the optical signal fed thereto from the Faraday rotator 4-N and is provided as an output optical signal from the optical variable attenuator 1a. The above basic operation is the same as described previously with reference to FIG. 2.

Next, a description will be given of the polarization-rotating angle control operation of each of the Faraday rotators 4-1 to 4-N.

The states that the Faraday rotators 4-1 to 4-N may assume by spontaneous magnetization will hereinafter be indicated by "+" and "−." The states can be switched between them by supplying currents to the electromagnetic coils 5-1 to 5-N wound around the Faraday rotators 4-1 to 4-N.

Let it be assumed, for example, that the Faraday rotator 4-1 takes a value "Θ1+" or "Θ1−" as its polarization-rotating angle. Similarly, the Faraday rotators 4-2 to 4-N take values "Θ2+" or "Θ2−" to "ΘN+" or "ΘN−" as their polarization-rotating angles.

Assuming that the Faraday rotators 4-1 to 4-N are all in the state "−" in the initial state of the optical variable attenuator 1a according to Embodiment 1, the polarization-rotating angles by the N Faraday rotators 4-1 to 4-N are (Θ1−)+(Θ2−)+ . . . +(ΘN−).

In this instance, when a control signal for changing the state of the Faraday rotator 4-M (M being an integer equal to or greater than 1 and equal to or smaller than N) from "−" to "+" is sent superimposed on the optical signal from a transmitting terminal station not shown, the control signal detector circuit 8 detects the control signal from the optical signal, and provides it to the control current generator circuit 9.

Based on the control signal, the control current generator circuit 9 applies a pulse current to the electromagnetic coil 5-M. As a result, the polarization-rotating angle of the Faraday rotator 4-M surrounded by the electromagnetic coil 5-M changes from "ΘM−" to "ΘM+."

On the other hand, the polarization-rotating angles of the N Faraday rotators 4-1 to 4-N are (Θ1−)+(Θ2−)+ . . . +(ΘM+)+ . . . +(ΘN−) (when M=2<M<N).

As described above, the optical variable attenuator 1a is capable of independently switching the state of each of the Faraday rotators 4-1 to 4-N by applying a pulse current to a particular one of the electromagnetic coils in accordance with the control signal superimposed on the optical signal that propagates in the optical transmission line.

Further, the optical variable attenuator of the present invention permits setting $2^N$ loss characteristics even if the Faraday rotators 4-1 to 4-N are formed of the ferromagnetic material, and hence it is suitable for use in an optical communication system that is difficult of frequent maintenance of its parts and requires long-term reliability, such as an optical submarine cable system

What is claimed is:

1. An optical variable attenuator comprising:

polarizer means for extracting a predetermined polarized wave component from an input optical signal;

polarized-wave rotating means for rotating the polarized wave component, including
an array of Faraday rotators formed of a ferromagnetic material and arranged in series between said polarizer means, and
magnetic field supply means for applying a magnetic field to each of said Faraday rotators; and polarization-rotating angle control means for setting a polarization-rotating angle of said Faraday rotator array based on a combination of polarization-rotating angles set for said each Faraday rotator, by controlling the intensity of the magnetic field supplied to said each Faraday rotator from said magnetic field supply means, wherein the optical variable attenuator further comprises control signal detection means for detecting a control signal which is sent superimposed on the optical signal, and wherein the polarization-rotating angle control means controls the intensity of the magnetic field supplied to the Faraday rotator from the magnetic field supply means based on the control signal detected by the control signal detection means.

2. The optical variable attenuator of claim 1, wherein:

said Faraday rotator array comprises at least two Faraday rotators of different polarization-rotating angles; and said polarization-rotating angle control means sets the polarization-rotating angle of said Faraday rotator array based on a combination of said different polarization-rotating angles set for said at least two Faraday rotators.

3. An optical variable attenuator, comprising:

polarizers configured to extract a predetermined polarized wave component from an input optical signal;

means for rotating a plane of polarization of the polarized wave component;

electromagnetic coils configured to supply magnetic fields to the rotating means; and current supply control circuits configured to control currents supplied to each of the electromagnetic coils, wherein the optical variable attenuator further comprises control signal detection means for detecting a control signal which is sent superimposed on the optical signal, and wherein the rotating means controls the intensity of the magnetic field supplied from the electromagnetic coils based on the control signal detected by the control signal detection means.

* * * * *